(12) United States Patent
Park et al.

(10) Patent No.: US 7,271,541 B2
(45) Date of Patent: Sep. 18, 2007

(54) SURFACE LIGHT SOURCE WITH HOLLOW ELECTRODE COMPONENT FOR USE IN LIQUID CRYSTAL DISPLAY DEVICES

(75) Inventors: Hae-Il Park, Seoul (KR); Sang-Yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/219,275

(22) Filed: Sep. 2, 2005

(65) Prior Publication Data
US 2006/0091774 A1 May 4, 2006

(30) Foreign Application Priority Data
Oct. 28, 2004 (KR) .................. 10-2004-0086719

(51) Int. Cl.
*H01J 17/00* (2006.01)
*H01J 17/02* (2006.01)

(52) U.S. Cl. .................. 313/609; 313/581; 313/611; 313/247

(58) Field of Classification Search ............. 313/317, 313/356, 339, 346 DC, 618
See application file for complete search history.

(56) References Cited

U.S. PATENT DOCUMENTS 4,767,965 A * 8/1988 Yamano et al. ............ 313/491
5,461,279 A * 10/1995 Hasegawa .................. 313/493
2005/0046331 A1* 3/2005 Kim et al. .................. 313/493
2005/0275765 A1* 12/2005 Jang et al. .................. 349/62

FOREIGN PATENT DOCUMENTS

JP 60189154 A * 9/1985
JP 02012749 A * 1/1990

OTHER PUBLICATIONS

"Design of a Multi-Channel True Flat Fluorescent Lamp for Avionic AM-CLD Backlighting"; Authors: Munisamy Anandan, Douglas Ketchum, Hank Etlinger, Robert Kirker and William Carr; IEEE Transactions on Electron Devices, vol. 41, No. 4; Dated: Apr. 1994.

* cited by examiner

*Primary Examiner*—Mariceli Santiago
(74) *Attorney, Agent, or Firm*—Cantor Colburn LLP

(57) ABSTRACT

A surface light source device includes a first substrate, a second substrate and a hollow electrode. The second substrate is combined with the first substrate to form a plurality of discharge spaces. The second substrate includes a plurality of recesses. The hollow electrode is disposed in each of the discharge spaces under the recesses of the second substrate, respectively. The surface light source device further includes an external electrode disposed on a lower surface of the first substrate corresponding to the hollow electrode. The external electrodes are on an outer surface of the lamp body, and are partially overlapped with the discharge spaces. The hollow electrode may have a rectangular tube or other suitable shape. As a result of the foregoing construction, the life span of the surface light source device may increase, and the light emitting efficiency may similarly increase.

35 Claims, 7 Drawing Sheets

SURFACE LIGHT SOURCE WITH HOLLOW ELECTRODE COMPONENT FOR USE IN LIQUID CRYSTAL DISPLAY DEVICES

This application claims priority to Korean Patent Application No. 2004-86719 filed on Oct. 28, 2004, and all of the benefits occurring therefrom under 35 USC § 119, the contents of which are herein incorporated by reference in its entirety.

BACKGROUND OF THE INVENTION

1. Field of the Invention

The present invention relates to a surface light source device and a liquid crystal display (LCD) device having the surface light source device. More particularly, the present invention relates to a surface light source device capable of supplying a surface light to a liquid crystal display panel to display images, and an LCD device having the surface light source device.

2. Description of the Related Art

There are a variety of flat panel devices and a liquid crystal display (LCD) device represents one such type of flat panel display device. The LCD device displays images using liquid crystal. The LCD device has various merits, such as, for example, thin thickness, light weight, low driving voltage, low power consumption, etc. Therefore, the LCD device has been used in various fields.

The LCD device is a non-emissive type display device so that the LCD device includes a backlight assembly to provide light.

In general, the backlight assembly employs a cold cathode fluorescent lamp (CCFL) as a light source. As the LCD device becomes large in size, the number of CCFLs required for the LCD device increases. As LCD devices increase in size, manufacturing costs are also increased and optical properties such as luminance uniformity will decrease, that is, become deteriorated.

A surface light source device has been developed to solve the above-mentioned problems. The surface light source device includes a lamp body having a plurality of discharge spaces and external electrodes for applying a discharge voltage to the lamp body.

When an inverter applies the discharge voltage to the external electrodes of the surface light source device, the surface light source device generates ultraviolet light through a discharge gas in each of the discharge spaces. The ultraviolet light is converted into visible light through a fluorescent layer formed on an inner surface of the lamp body.

When the surface light source device is operated only through the external electrodes, the associated light emitting efficiency is lowered. Therefore, a surface light source device that further includes hollow electrodes disposed in the lamp body has been developed in order to enhance the light emitting efficiency.

The surface light source device having the hollow electrodes has a relatively higher light emitting efficiency than the conventional surface light source device, but ions that are accelerated by the discharge voltage collide with the hollow electrodes. Therefore, the life span of the hollow electrodes is decreased and a portion of an electrode is blackened.

BRIEF SUMMARY OF THE INVENTION

The present invention provides a surface light source device capable of increasing the life span of a hollow electrode and improving the light emitting efficiency.

The present invention provides an LCD apparatus having the above-mentioned surface light source device.

A surface light source device in accordance with an exemplary embodiment includes a first substrate, a second substrate and a hollow electrode. The second substrate is combined with the first substrate to form a plurality of discharge spaces. The second substrate includes a plurality of recesses. The hollow electrode is disposed in each of the discharge spaces under the recesses of the second substrate, respectively.

The second substrate includes a plurality of discharge space portions, a plurality of space division portions and a sealing portion. The discharge space portions are spaced apart from the first substrate to form the discharge spaces. Each of the space division portions is disposed between adjacent ones of the discharge space portions. The space division portions make contact with the first substrate. The sealing portion corresponds to a peripheral portion of the second substrate. The first and second substrates are combined with each other through the sealing portion. A pair of recesses are formed at both end portions of each of the discharge space portions, respectively.

In an exemplary embodiment, a cross section of the hollow electrode may have a U-shape. Alternatively, in other exemplary embodiments, the hollow electrode may have a box shape with one open face, a cylindrical tube shape, etc.

An LCD device in accordance with an exemplary embodiment includes a surface light source device, an inverter and an LCD panel. The surface light source device includes a first substrate, a second substrate and a hollow electrode. The second substrate is combined with the first substrate to form a plurality of discharge spaces. The second substrate includes a plurality of recesses. The hollow electrode is disposed in each of the discharge spaces under the recesses of the second substrate, respectively. The inverter generates a discharge voltage to operate the surface light source device. The LCD panel displays images by using the light provided by the surface light source device.

According to the present invention, ions that are accelerated by plasma will not create sputter in the hollow electrode. Therefore, the life span of the hollow electrodes may be increased and the light emitting efficiency may be improved.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

It should be understood that the exemplary embodiments of the present invention described below may be varied and modified in many different ways without departing from the inventive principles disclosed herein, and the scope of the present invention is therefore not limited to these particular embodiments which follow. Rather, these embodiments are provided so that this disclosure will be thorough and complete, and will fully convey the concept of the invention to those skilled in the art by way of example and not by way of limitation.

Hereinafter, the present invention will be described in detail with reference to the accompanying drawings.

Figure 1:
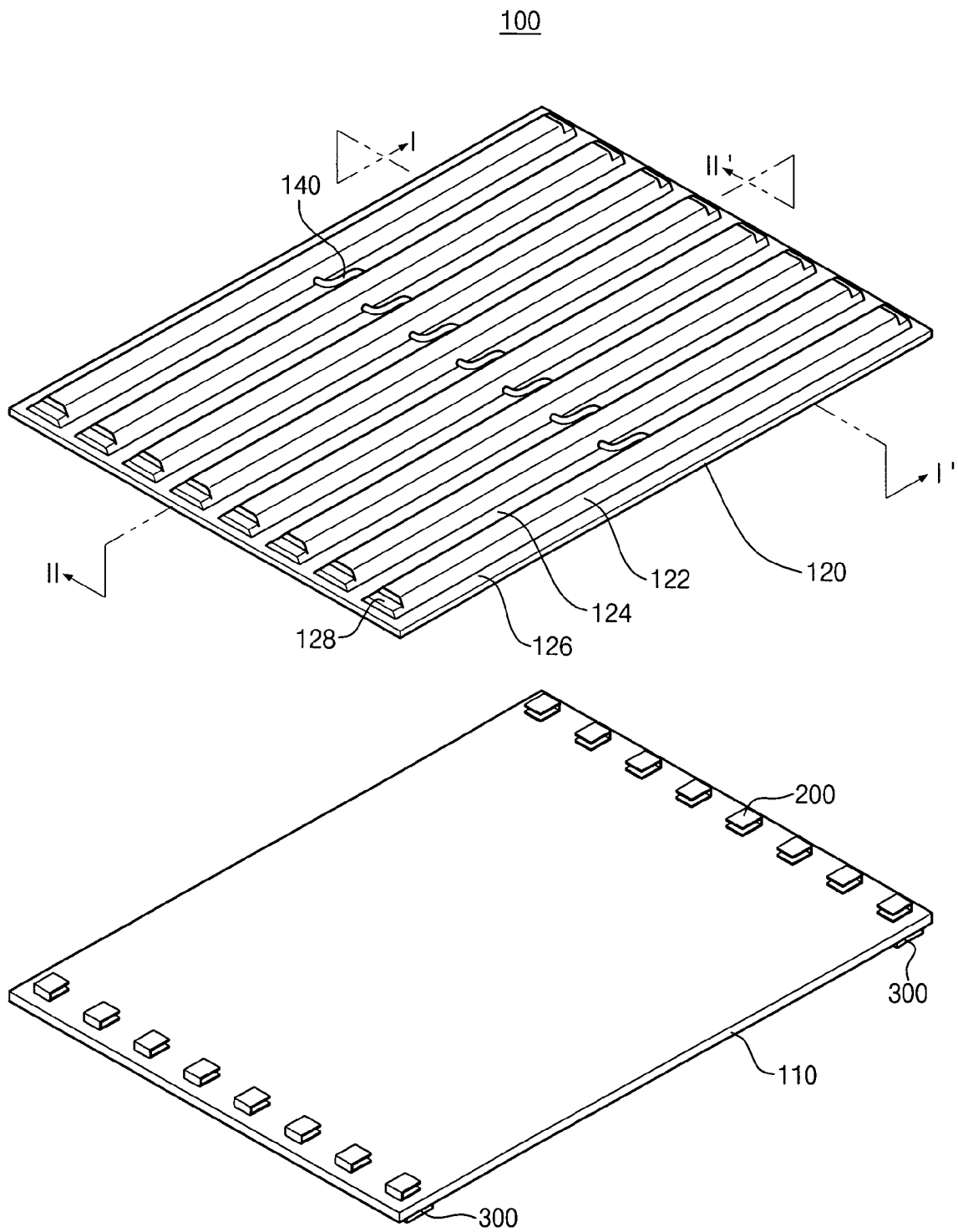
FIG. 1 is an exploded perspective view showing a surface light source device in accordance with an exemplary embodiment of the present invention.
Figure 2:
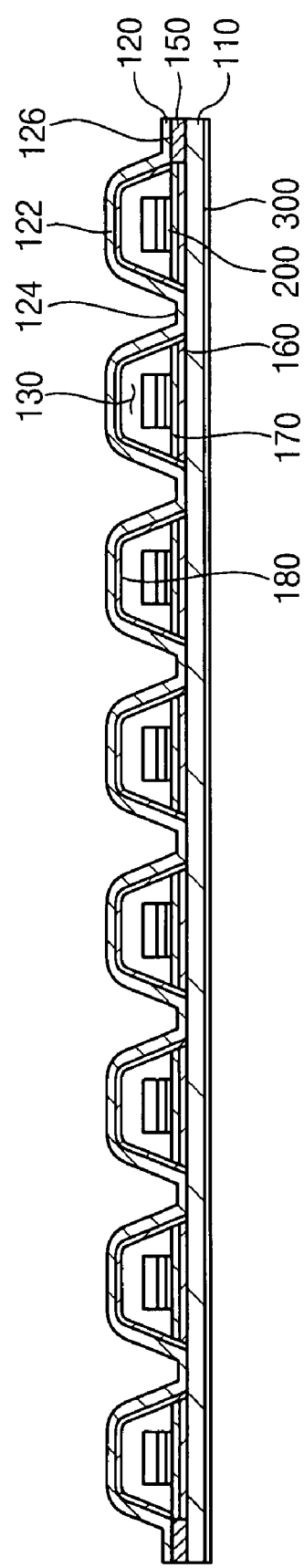
FIG. 2 is a cross-sectional view taken along line I-I' in FIG. 1.

FIG. 1 is an exploded perspective view showing a surface light source device in accordance with an exemplary embodiment of the present invention. FIG. 2 is a cross-sectional view taken along line I-I' in FIG. 1.

Referring to FIGS. 1 and 2, the surface light source device 100 includes a first substrate 110, a second substrate 120 and a plurality of hollow electrodes 200, each hollow electrode including a discharge space 130.

The first substrate 110 may have a rectangular plate shape. The first substrate 110 may include, for example, glass. The first substrate 110 may further include a material that prevents leakage of an ultraviolet light that is generated from discharge gas in discharge spaces 130.

The second substrate 120 is combined with the first substrate 110 to form the discharge spaces 130. The second substrate 120 includes an optically transparent material. The second substrate 120 may also include, for example, a glass. The second substrate 120 may further include a material that prevents leakage of the ultraviolet light that is generated from the discharge spaces 130.

The second substrate 120 includes a plurality of discharge space portions 122, a plurality of space division portions 124 and a sealing portion 126. The discharge space portions 122 are spaced apart from the first substrate 110 to form the discharge spaces 130. Each of the space division portions 124 is disposed between the discharge space portions 122 adjacent to each other such that each space division portion 124 defines the boundary between two adjacent discharge space portions 122. The space division portions 124 preferably make contact with the first substrate 110. The sealing part 126 is provided along and corresponds to edge portions of the second substrate 120. The second substrate 120 has recesses 128 that are recessed toward the hollow electrodes 200 to be disposed over the hollow electrodes 200. The recesses 128 are formed at both longitudinal end portions of each of the discharge space portions 122 corresponding to the hollow electrodes 200.

The second substrate 120 may, for example, be formed using a molding process. In particular, a plate-shaped base substrate is heated and then is compressed by a mold to form the discharge space portions 122, the space division potions 124, the sealing portion 126 and the recesses 128. The second substrate 120 may also be formed using other various methods. For example, the base substrate may be heated and then processed using air suction (or vacuum pressure), thereby obtaining a desired shape.

As shown in FIG. 2, in an exemplary embodiment, each of the discharge space portions 122 has, for example, a trapezoidal shape with rounded corners. Alternatively, each of the discharge space portions 122 may have other various, suitable shapes such as a semi-circular shape, a rectangular shape, etc.

The second substrate 120 may further includes a plurality of connection passages 140. The connection passages 140 are disposed at the space division portions 124. Each of the connection passages 140 interconnects adjacent discharge spaces 130.

Alternatively, in another exemplary embodiment, more than one of the connection passages 140 may be formed at each of the space division portions 124. When air contained in the discharge spaces 130 is exhausted or a discharge gas is injected into the discharge spaces, the air or the discharge gas may pass between the discharge spaces 130 through the connection passage 140. The connection passage 140 may be formed using the aforementioned molding process for forming the second substrate 120. The connection passage 140 may be configured in a variety of suitable shapes in order to connect adjacent discharge spaces 130 to each other. An example of one such suitable shape for the connection passage 140 is, for example, an S shape.

The second substrate 120 is combined with the first substrate through an adhesive member 150 such as a frit. In an exemplary embodiment, the frit is a mixture of a glass and a metal, and has a lower melting point than the glass present in the first and second substrates 110 and 120. In order to combine the first substrate 110 with the second substrate 120, the frit is interposed between the first and second substrates 110 and 120 with the frit being disposed at the sealing portion 126. The frit is then heated to combine the first and second substrates 110 and 120.

In an exemplary embodiment, the adhesive member 150 is disposed only at the sealing portion 126 between the first substrate 110 and the second substrate 120. In other words, the adhesive member 150 is not disposed at the space division portions 124 that make contact with the first substrate 110. The space division portions 124 make contact with the first substrate 110 due to a pressure difference between an inside and an outside of the surface light source device 100. More particularly, after combining the first substrate 110 with the second substrate 120, air contained in the discharge spaces 130 is exhausted, and then discharge gas for a plasma discharge is injected into the discharge spaces 130. The discharge gas may include, for example, mercury (Hg), neon (Ne), argon (Ar), xenon (Xe), krypton (Kr), a mixture thereof, etc. In an exemplary embodiment, the pressure of the discharge gas in the discharge spaces 130 is about fifty Torr to about seventy Torr when the atmospheric pressure is 760 Torr. The result is that a pressure difference is formed between the inside and the outside of the surface light source device 100 so that the space division portions 124 make contact with the first substrate 110.

The hollow electrodes 200 are formed on an upper surface of the first substrate 110 corresponding to the discharge spaces 130, respectively. That is, the hollow electrodes 200 are formed on the surface that faces the second substrate 120. Spaced rows of the hollow electrodes 200 are positioned on both end portions of the discharge spaces 130, respectively (as best shown in FIG. 1). Each of the hollow electrodes 200 is attached to the first substrate 110 through an adhesive member such as a frit. The hollow electrode 200 may be made from, for example, nickel (Ni), chromium (Cr), molybdenum (Mo), tungsten (W), or an alloy of at least two metals such as nickel (Ni), chromium (Cr), iron (Fe), etc.

The surface light source device 100 further includes a pair of first external electrodes 300. Each of the first external electrodes 300 is formed on a lower surface of the first substrate 100 corresponding to the position of the hollow electrodes 200. The first external electrodes 300 are substantially perpendicular to a longitudinal direction of the discharge space portions 122 such that the first external electrodes 300 are overlapped with both end portions of the discharge spaces 130, respectively.

The first external electrode 300 is preferably comprised from a material that is easily molded and has a relatively high electrical conductivity. For example, a silver paste may be coated on the lower surface of the first substrate 110 to form the first external electrodes 300. The silver paste corresponds to a mixture of silver (Ag) and a silicon oxide (SiOx). Alternatively, in another exemplary embodiment, a metal powder such as copper (Cu), nickel (Ni), silver (Ag), gold (Au), aluminum (Al), chromium (Cr), a mixture thereof, etc., may be spray coated on the lower surface of the first substrate 110 to form the first external electrodes 300. A discharge voltage is applied to the first external electrode 300 from an inverter (not shown). In addition, the first external electrode 300 may further include an insulating layer (not shown) coated thereon in order to protect and insulate the first external electrode 300 from an exterior of the surface light source device 100.

In the surface light source device 100, a capacitance formed by the first external electrodes 300, the hollow electrode 200 and the first substrate 110 that is disposed between the first external electrode 300 and the hollow electrode 200 acts as a ballast so that all of the discharge spaces 130 may be simultaneously operated in parallel. As a result, the discharge voltage may be decreased and the discharge efficiency may be increased.

The surface light source device 100 optionally includes a pair of second external electrodes (not shown) that are formed on an upper surface of the second substrate 120 to be disposed over the first external electrode 300. The second external electrode may be formed on an upper surface of the second substrate 120 using the same material and the same forming method as that of the first external electrode 300.

The surface light source device 100 may further include a reflective layer 160, a first fluorescent layer 170 and a second fluorescent layer 180.

The reflective layer 160 is disposed on the upper surface of the first substrate 110. The first fluorescent layer 170 is disposed on the reflective layer 160. The second fluorescent layer 180 is disposed on the lower surface of the second substrate 120.

The reflective layer 160 reflects visible light generated by the first and second fluorescent layers 170 and 180 toward the second substrate 120 so that a leakage of the light to the first substrate 110 may be prevented. The reflective layer 160 may include metal oxide to increase optical reflectivity and decrease a change in the color coordinate of the light. For example, the reflective layer 160 may include aluminum oxide or barium sulfate.

The first fluorescent layer 170 is formed on the reflective layer 160. The second fluorescent layer 180 is formed on the lower surface of the second substrate 120. When the ultraviolet light generated by discharge gas enters the first and second fluorescent layers 170 and 180, the first and second fluorescent layers 170 and 180 convert the ultraviolet light into a visible light.

Before combining the first substrate 110 with the second substrate 120, the reflective layer 160, the first fluorescent layer 170 and the second fluorescent layer 180 are respectively formed as a thin film by using, for example, a spray method. The reflective layer 160 and the first fluorescent layer 170 are formed only on a region corresponding to the discharge space portions 122 of the first substrate 110. In other words, the reflective layer 160 and the first fluorescent layer 170 are not formed on the space division portions 124 and the sealing portion 126 of the first substrate 110. Alternatively, the reflective layer 160 and the first fluorescent layer 170 may be formed on a region corresponding to the discharge space portions 122 and the space division portions 124 of the first substrate 110. The second fluorescent layer 180 may be formed on a region corresponding to the discharge space portions 122 of the second substrate 120. Alternatively, the second fluorescent layer 180 may be formed on a region corresponding to the discharge space portions 122 and the space division portions 124 of the second substrate 120.

In addition, the surface light source device 100 may further include a protective layer (not shown). The protective layer may be disposed between the second substrate 120 and the second fluorescent layer 180 and/or the first substrate 110 and the reflective layer 160. The protective layer acts to prevent a chemical reaction between mercury present in the discharge gas and the first substrate 110 or between any such mercury and the second substrate 130 so that a loss of the mercury and a resultant blackening of the surface light source device 100 is prevented.

Figure 3:
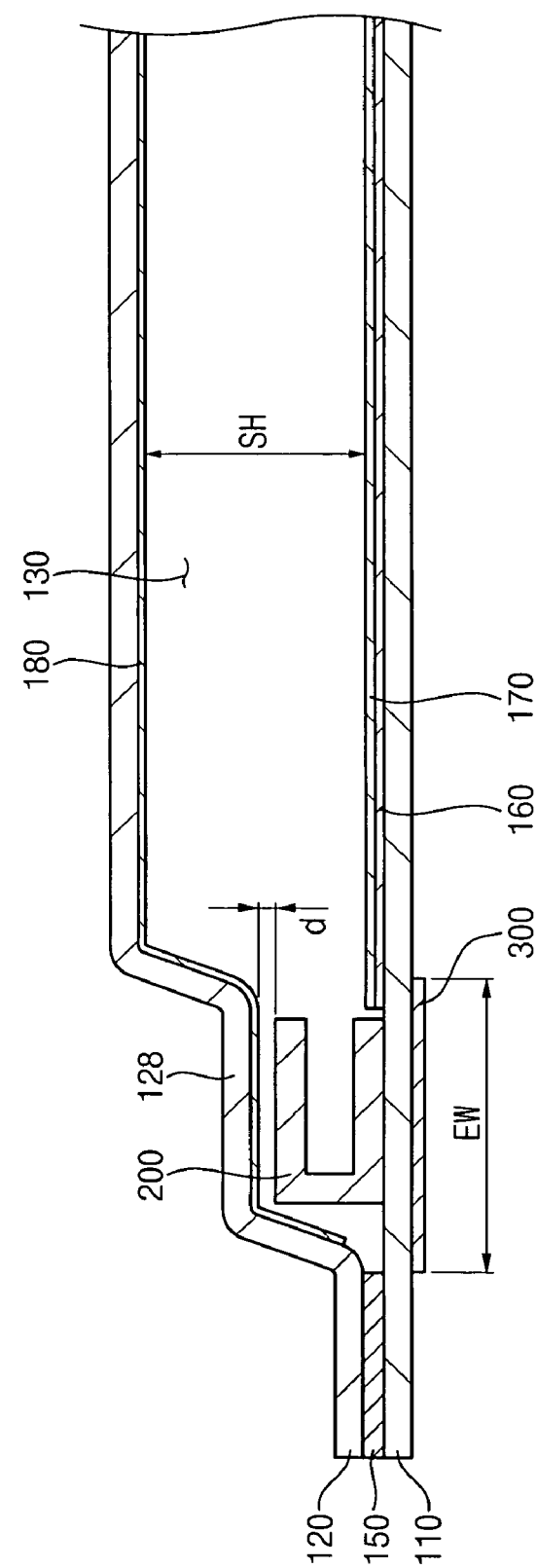
FIG. 3 is a cross-sectional view taken along line II-II' in FIG. 1.
Figure 4:
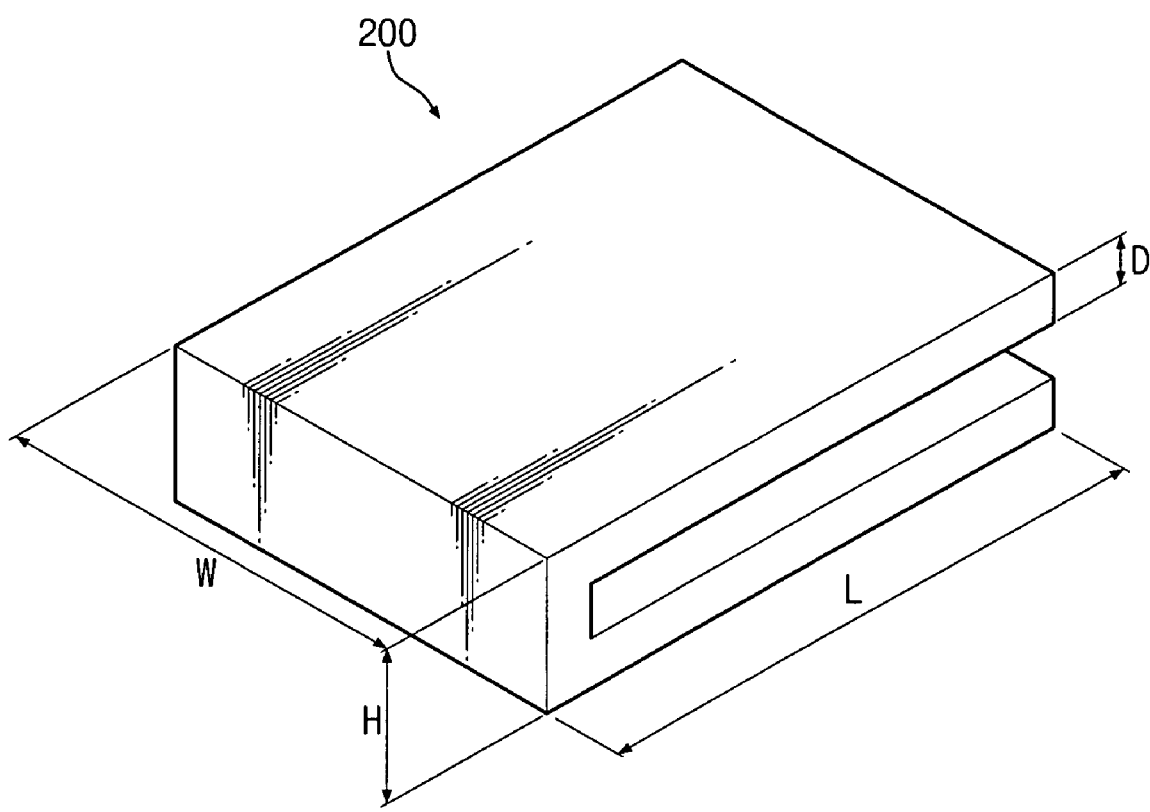
FIG. 4 is a perspective view showing an exemplary embodiment of a hollow electrode as shown in FIG. 1.

FIG. 3 is a cross-sectional view taken along line II-II' in FIG. 1. FIG. 4 is a perspective view showing the hollow electrode depicted in FIG. 1.

Referring to FIGS. 3 and 4, a plurality of hollow electrodes 200 is attached to a first substrate 110, and in an exemplary embodiment, each of the hollow electrodes 200 has a U-shape. The hollow electrodes 300 are disposed at both sides of the discharge spaces 130 to be disposed over the external electrode 300, respectively. A pair of the hollow electrodes 200 is disposed at both end portion of each of the discharge spaces 130, respectively, such that concave portions of the hollow electrodes 200 face each other.

The height of the hollow electrode 200 may preferably satisfy the following equation 1 that is disclosed in "IEEE transactions on electron device", vol. 41, No 4, p 504.

$$P \times H = 10 (\text{Torr} \times \text{cm}), \qquad <\text{Equation 1}>$$

wherein 'P' represents a gas pressure of the discharge gas in the discharge spaces 130, and 'H' represents a height of the hollow electrode 400.

For example, the gas pressure of the discharge gas may be in a range of about fifty torr to about seventy torr. Therefore, the height H of the hollow electrode 200 may be in a range of about 1.4 mm to about 2 mm in order to satisfy Equation 1.

When the width of the hollow electrode 200 increases, an electric characteristic of the hollow electrode 200 is improved. However, the width of the hollow electrode 200 may be shorter than the distance between adjacent discharge spaces 130. For example, in an exemplary embodiment, the width W of the hollow electrode 200 is about 10 mm, thus the width W of the hollow electrode is no more than about 8 mm. Also, the length L of the hollow electrode 200 may be shorter than an electrode width (EW) of the first external electrode 300. For example, the electrode width of the first external electrode 300 is about 15 mm, thus the length L of the hollow electrode 200 is about 10 mm.

The second substrate 120 includes recesses 128. Each of the recesses 128 corresponds to each of the hollow electrodes 200. Both end portions of each of the discharge space portions 122 are preferably recessed to form the recesses 128 that are disposed over the hollow electrode 200 so that a distance 'd' between an upper surface of the hollow electrode 200 and a lower surface of the second substrate 120 is reduced. As a result, a collision between ions that are accelerated by plasma and the hollow electrode 200 is also reduced. More particularly, the distance 'd' between the hollow electrode 200 and the recess 128 is equal to or less than about 0.4 mm. For example, when the height 'H' of the hollow electrode 200 is about 1.4 mm and a space height SH of the discharge space 130 is about 2.4 mm, the recess 128 is recessed toward the hollow electrode 200 by an amount of about 0.6 mm to about 1.0 mm. A thickness 'D' of the hollow electrode 200 is about 0.5 mm.

The recess 128 that is adjacent to the hollow electrode 200 reduces any collisions between the ions accelerated by the plasma from the hollow electrode 200. Therefore, any deleterious ion sputtering of the hollow electrode 200 may be decreased.

Figure 5:
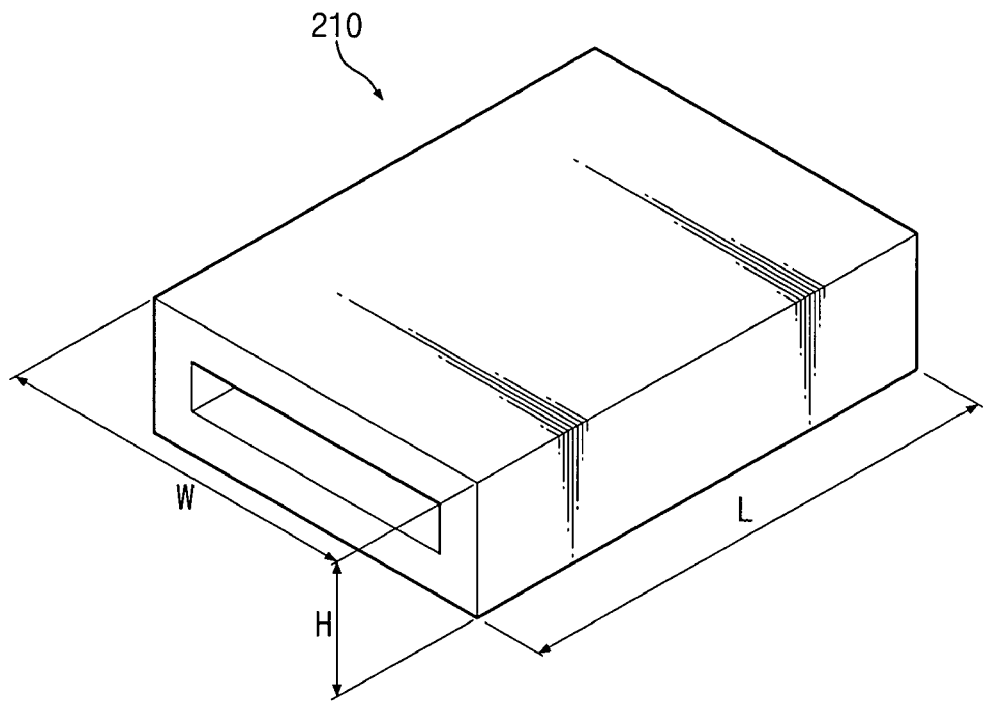
FIG. 5 is a perspective view showing another exemplary embodiment of hollow electrode as shown in FIG. 1.

FIG. 5 is a perspective view showing another exemplary hollow electrode of the type shown in FIG. 1.

Referring to FIGS. 1 and 5, the hollow electrode 210 has a rectangular tube shape, and a pair of the hollow electrodes 210 having a rectangular tube shape may be disposed at both end portions of each of the discharge spaces, respectively, along a longitudinal direction of the hollow electrode 210. Alternatively, the hollow electrode 210 may have a box shape with one open face and a pair of the hollow electrodes 210 having a box shape with one open face may be disposed at both end portions of each of the discharge spaces, respectively, such that open faces of the pair of hollow electrodes 210 face each other. The hollow electrode 210 is attached to the first substrate 110 through an adhesive member such as a frit.

For example, the hollow electrode 210 has a height H of about 1.4 mm to about 2 mm, a width W of no more than about 8 mm and a length L of no more than about 5 mm.

Figure 6:
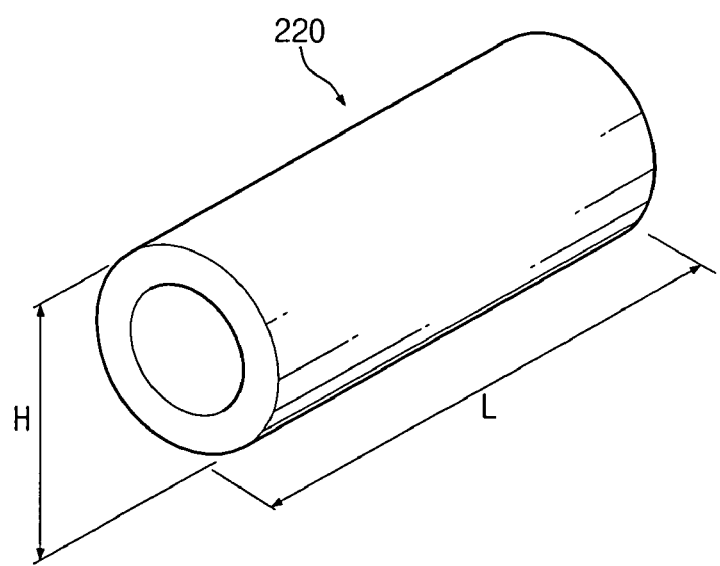
FIG. 6 is a perspective view showing still another exemplary embodiment of a hollow electrode as shown in FIG. 1.

FIG. 6 is a perspective view showing another exemplary hollow electrode in FIG. 1.

Referring to FIGS. 1 and 6, the hollow electrode 220 has a cylindrical tube shape, and a pair of the hollow electrodes 220 having a cylindrical tube shape is disposed at both end portions of each of the discharge spaces, respectively, along a longitudinal direction of the hollow electrode 220. Alternatively, the hollow electrode 220 may have a cylinder shape with an open upper face, and a pair of the hollow electrodes 220 having a cylinder shape with an upper open face is disposed at both end portions of each of the discharge spaces, respectively, such that open faces of the pair of the hollow electrodes 210 face each other. The hollow electrode 220 is attached to the first substrate 110 through an adhesive member such as a frit. For example, the hollow electrode 220 has a height 'H' of about 1.4 mm to about 2 mm, and a length 'L' of no more than about 15 mm.

Figure 7:
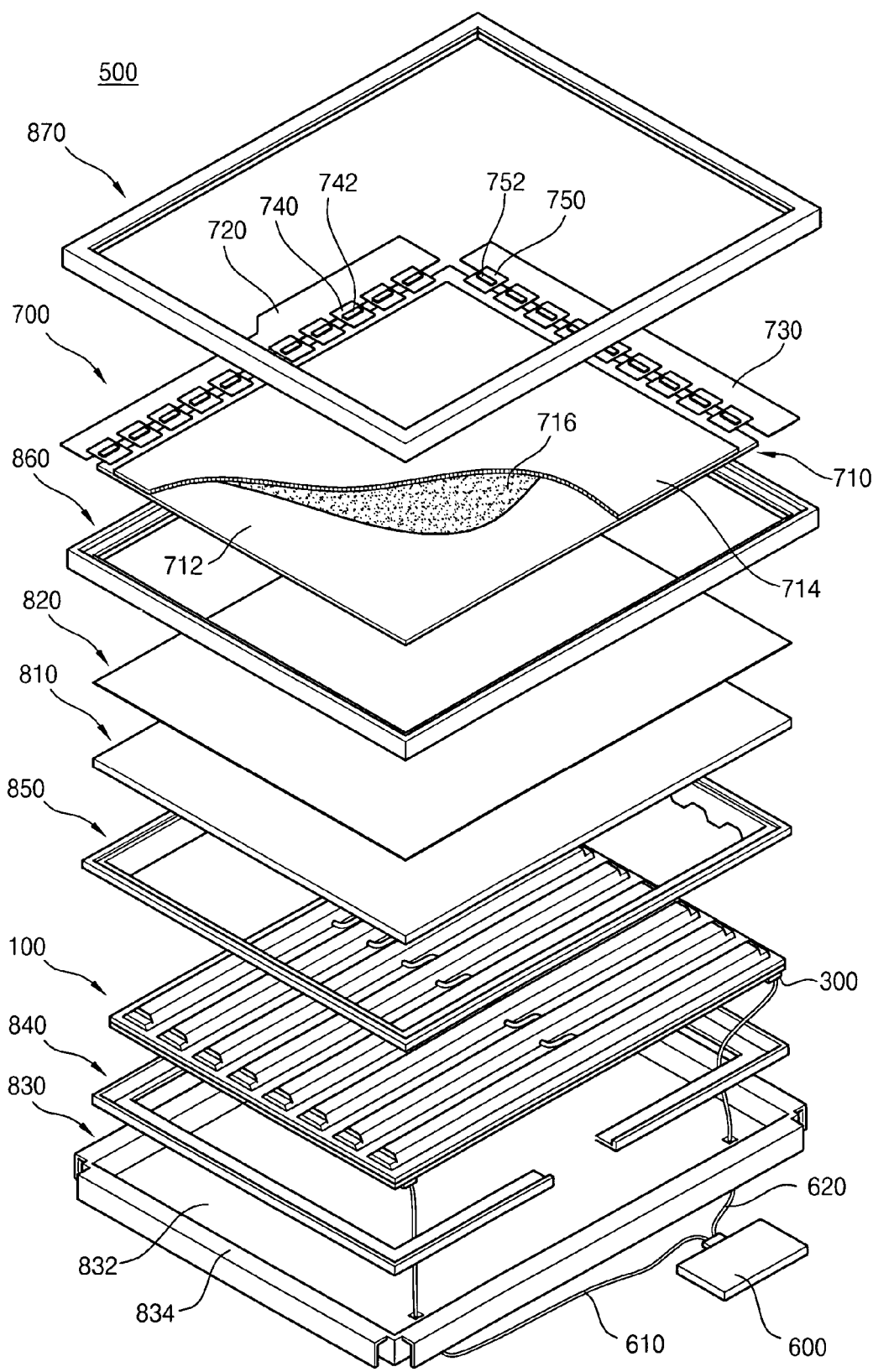
FIG. 7 is an exploded perspective view showing an LCD device in accordance with an exemplary embodiment of the present invention.
Figure 8:
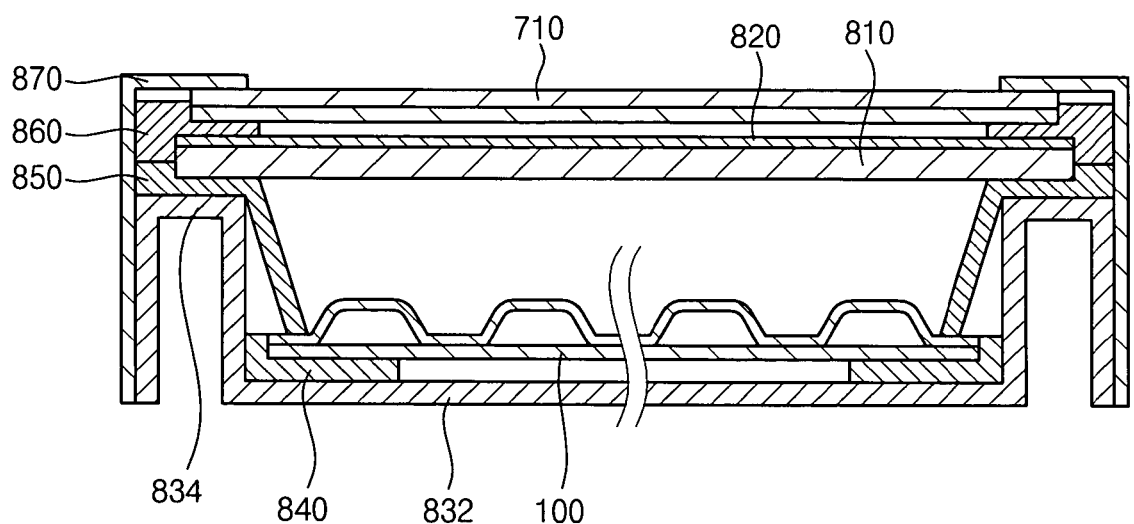
FIG. 8 is a cross-sectional view showing the LCD device from FIG. 7.

FIG. 7 is an exploded perspective view showing an LCD device in accordance with a n exemplary embodiment of the present invention. FIG. 8 is a cross-sectional view showing the LCD device in FIG. 8. In the present embodiment, the surface light source device of FIGS. 7 and 8 is substantially the same as that shown in FIG. 1. Thus, the same reference numerals will be used to refer to the same or like parts as those described in FIG. 1 and any further explanation will be omitted.

Referring to FIGS. 7 and 8, the liquid crystal display device 500 includes a surface light source device 100, an inverter 600 and a display unit 700.

The inverter 600 generates a discharge voltage to operate the surface light source device 100. The inverter 600 inverts an alternating voltage that originates from outside of the LCD device 500 into a discharge voltage to operate the surface light source device 100. The inverter 600 is disposed on a backside of a receiving container 830. The discharge voltage generated by the inverter 600 is applied to an external electrode 300 through a first power supply line 610 and a second power supply line 620.

The display unit 700 includes an LCD panel 710, a data printed circuit board (data PCB) 720 and a gate printed circuit board (gate PCB) 730. The LCD panel displays images by using light generated by the surface light source device 100. The data and gate PCBs 720 and 730 generate driving signals to drive the LCD panel 710.

Driving signals generated by the data and gate PCBs 720 and 730 are applied to the LCD panel 710 through a data flexible circuit film 740 and a gate flexible circuit film 750. For example, a tape carrier package (TCP) or a chip on film (COF) may be used as the data and gate flexible circuit films 740 and 750. Also, the data and gate flexible circuit films 740 and 750 further include a data driving chip 742 and a gate driving chip 752 which control the driving signals, respectively, to apply the driving signals to the LCD panel 710 at a proper time.

The data PCB 720 is disposed at a side surface or at a backside surface of the receiving container 830 by bending the data flexible circuit film 740. The gate PCB 730 is disposed on the side surface or on the backside surface of the receiving container 830 by bending the gate flexible circuit film 750. When an additional signal line (not shown) is formed on the LCD panel 710 and the gate flexible circuit film 750, the LCD device 500 may require no gate PCB 830.

The LCD panel 710 includes a thin film transistor (TFT) substrate 712, a color filter substrate 714 and a liquid crystal layer 716. The color filter substrate 714 faces the TFT substrate 712. The liquid crystal layer 716 is positioned between the TFT substrate 712 and the color filter substrate 714.

The TFT substrate 712 includes a first transparent substrate, and a plurality of switching devices formed on the first transparent substrate. The switching devices are arranged in a matrix shape. A TFT (not shown) may be used to form each of the switching devices. A source electrode (not shown) of the TFT is electrically connected to a gate line formed on the transparent glass plate. A gate electrode (not shown) of the TFT is electrically connected to a gate line formed on the transparent glass plate. A drain electrode (not shown) of the TFT is electrically connected to a pixel electrode (not shown) formed on the transparent glass plate.

The color filter substrate 714 includes a second transparent substrate, a red color filter (not shown), a green color filter (not shown) and a blue color filter (not shown). The red, green and blue color filters (not shown) are formed on the second transparent substrate through a deposition process, a coating process, a photo process, etc. A common electrode (not shown) is formed on the color filter substrate 714 having the red, green and blue color filters (not shown). The common electrode includes an optically transparent and electrically conductive material.

When a gate voltage is applied to the gate electrode of the TFT, the TFT is turned on so that a data voltage is applied to the pixel electrode through the TFT. When the data voltage is applied to the pixel electrode, an electric field is generated between the pixel electrode of the TFT substrate 712 and the common electrode of the color filter substrate 714 to alter an arrangement of liquid crystal molecules of the liquid crystal layer 116. When an arrangement of the liquid crystal molecules is altered, an optical transmittance of the liquid crystal layer 116 is changed by pixel unit to display an image.

The liquid crystal display device 500 may further include a diffusion plate 810 and an optical sheet 820. The diffusion plate 810 is disposed between the surface light source device 100 and the LCD panel 710. The optical sheet 820 is disposed on the diffusion plate 810.

When light generated by the surface light source device 100 passes through the diffusion plate 810, the uniformity of the luminance increases. The diffusion plate 810 has a plate-shape that has a uniform thickness. The diffusion plate 810 is spaced apart from the surface light source device 100. The diffusion plate 810 is comprised of, for example, polymethylmethacrylate (PMMA).

When the light diffused by the diffusion plate 810 passes through the optical sheet 820, the uniformity of the luminance is further enhanced. The optical sheet 820 may include a prism sheet (not shown). The prism sheet 820 condenses the diffused light that exits the diffusion plate 810 and guides the condensed light toward a front surface of the LCD device 500 to enhance front-view luminance. The optical sheet 820 may include a diffusion sheet to further diffuse the light diffused from the diffusion plate 810. Alternatively, the liquid crystal display device 500 may include an auxiliary optical sheet. The diffusion liquid crystal display device 500 may include an auxiliary optical sheet. The LCD device 500 optionally includes the diffusion plate 810, the diffusion sheet, the prism sheet, etc.

The liquid crystal display device 500 may further include a receiving container 830. The receiving container 830 receives the surface light source device 100. The receiving container 830 includes a bottom plate 832 and a plurality of sidewalls 834. Each of the sidewalls 834, for example, has an inverted U shape so that the receiving container is securely combined with other elements such as the inverter 820, a supporting member 840, a first mold 850 and a top chassis 870. The receiving container 830 may include metal having excellent strength and relatively little deformation.

The liquid crystal display device 500 may further include the supporting member 840. The supporting member 840 is disposed between the surface light source device 100 and the receiving container 830. The supporting member 840 is disposed on a peripheral portion of the surface light source device 100. The supporting member 840 allows the surface light source device 100 to be spaced apart from the receiving container 830 so as to prevent electrical contact between the surface light source device 100 and the receiving container 830. The supporting member 840 may be made of an insulating material. In an exemplary embodiment, the supporting member 840 is made from an elastic material in order to absorb any impact that is provided from outside of the liquid display device 500. For example, the supporting member 840 may be comprised of a silicone. In an exemplary embodiment, the supporting member 840 is composed of two pieces having an U-shape. Alternatively, the supporting member 840 may be composed of four pieces having an L-shape. Alternatively, the supporting member 840 may be composed of four pieces, each of which corresponds to each of edges of the surface light source device 100. Alternatively, the supporting member 840 may be integrally formed.

The LCD device 500 may further include the first mold 850. The first mold 850 is disposed between the surface light source device 100 and the diffusion plate 810. The first mold 850 fastens the surface light source device 100 to the receiving container 830, and supports the diffusion plate 810. The first mold 850 is disposed on the surface light source device 100. The first mold 850 is combined with the sidewalls 834 of the receiving container 830, and fixes a peripheral portion of the surface light source device to the receiving container 830. As shown in FIG. 7, the first mold 850 may be integrally formed and have a frame shape. Alternatively, the first mold 850 may be divided into two pieces having an L shape or a U-shape.

The liquid crystal display device 500 further includes a second mold 860. The second mold 860 is disposed between the optical sheet 820 and the LCD panel 710. The second mold 860 fixes the optical sheet 820 and the diffusion plate 810 to the first mold 850, and supports the liquid crystal device panel 710. The second mold 860 may be integrally formed and have the substantially same frame shape as the first mold 850. Alternatively, the second mold 860 may be divided into two pieces having the L-shape or the U-shape.

The liquid crystal display device 500 further includes the top chassis 870 to prevent a drifting of the LCD panel 710. That is, the top chassis 870 fixes the LCD panel 710 with respect to the receiving container 830. The top chassis 870 is combined with the receiving container 830 to fix the LCD panel 710 to the second mold 860. The top chassis 870 may protect the LCD panel 710 from an external impact.

In accordance with the present invention, the surface light source device and the LCD device incorporating the surface light source device include recesses that are formed on the second substrate to be adjacent to the hollow electrodes so that the sputtering of the ions accelerated by the plasma to the hollow electrodes may be prevented. Therefore, the life span of the hollow electrodes may be increased and the light emitting efficiency may be similarly increased.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Moreover, the use of the terms first, second, etc. are used to distinguish one element from another. Furthermore, the use of the term a, an, etc. do not denote a limitation or quality, but rather denote the presence of at least one of the referenced items.

What is claimed is:

1. A surface light source device comprising:
a first substrate;
a second substrate assembled with the first substrate to form a plurality of discharge spaces, the second substrate including a plurality of recesses ; and
a hollow electrode being disposed in each of the discharge spaces and being disposed under the recess of the second substrate;
wherein the discharge spaces over the hollow electrode are reduced.

2. The surface light source device of claim 1, wherein the second substrate comprises:
a plurality of discharge space portions that are spaced apart from the first substrate to form the discharge spaces;
a plurality of space division portions, each of the space division portions being disposed between adjacent ones of the discharge space portions; and a sealing portion disposed along peripheral portions of the second substrate, the sealing portion interconnecting the first and second substrates.

3. The surface light source device of claim 2, wherein the space divisions portions are in contact with the first substrate.

4. The surface light source device of claim 2, wherein the discharge space portions have opposed end portions, respectively, and a recess is formed at each end portion of each discharge space portion.

5. The surface light source device of claim 2, wherein a cross-section of the hollow electrode has a U-shape.

6. The surface light source device of claim 2, wherein the hollow electrode has a rectangular tube shape.

7. The surface light source device of claim 2, wherein the hollow electrode has a box shape with one open face.

8. The surface light source device of claim 2, wherein the hollow electrode has a cylindrical tube shape.

9. The surface light source device of claim 2, wherein the hollow electrode has a rectangular shape with an open upper face.

10. The surface light source of claim 2, wherein the discharge space portions have a shape selected from the group consisting of trapezoidal, semi-circular and rectangular.

11. The surface light source device of claim 1, wherein a cross section of the hollow electrode has a U-shape.

12. The surface light source device of claim 1, wherein the hollow electrode has a rectangular tube shape.

13. The surface light source device of claim 1, wherein the hollow electrode has a box shape with one open face.

14. The surface light source device of claim 1, wherein the hollow electrode has a cylindrical tube shape.

15. The surface light source device of claim 1, wherein the hollow electrode has a rectangular shape with an open upper face.

16. The surface light source device of claim 1, wherein a distance between an upper surface of the hollow electrode and a lower surface of the recesses is equal to or less than about 0.4 mm.

17. The surface light source device of claim 1, wherein a height of the hollow electrode is equal to or less than about 2 mm.

18. The surface light source device of claim 1, further comprising a first external electrode that is disposed on a lower surface of the first substrate such that the first external electrode is disposed below the hollow electrode.

19. The surface light source device of claim 18, further comprising a second external electrode that is disposed on an upper surface of the second substrate such that the second electrode is disposed over the hollow electrode.

20. The surface light source device of claim 1, further comprising:
    a reflective layer disposed on an upper surface of the first substrate;
    a first fluorescent layer disposed on the reflective layer; and
    a second fluorescent layer disposed on a lower surface of the second substrate.

21. The surface light source of claim 1, further including a plurality of connection passages, wherein at least one connection passage interconnects adjacent ones of the discharge spaces.

22. The surface light source of claim 1, wherein the first substrate is assembled to the second substrate using an adhesive.

23. A liquid crystal display device, comprising:
    a surface light source device generating light, the surface light source device including:
        a first substrate;
        a second substrate assembled with the first substrate to form a plurality of discharge spaces, the second substrate including a plurality of recesses; and
        a hollow electrode being disposed in each of the discharge spaces and being disposed under the recess of the second substrate;
    an inverter that generates a discharge voltage to operate the surface light source device; and
    a liquid crystal display panel that displays images using the light generated by the surface light source device;
    wherein the discharge spaces over the hollow electrode are reduced.

24. The liquid crystal display device of claim 23, wherein the second substrate comprises:
    a plurality of discharge space portions that are spaced apart from the first substrate to form the discharge spaces;
    a plurality of space division portions, each of the space division portions being disposed between adjacent ones of the discharge space portions; and
    a sealing portion disposed along peripheral portions of the second substrate, the sealing portion interconnecting the first and second substrates.

25. The liquid crystal display device of claim 24, wherein the space division portions are in contact with the first substrate.

26. The liquid crystal display device of claim 23, wherein a distance between an upper surface of the hollow electrode and a lower surface of the recesses is equal to or less than about 0.4 mm.

27. The liquid crystal display device of claim 23, wherein the surface light source device further comprises an external electrode that is disposed on a lower surface of the first substrate such that the first external electrode is disposed below the hollow electrode.

28. The liquid crystal display device of claim 23, further comprising:
    a diffusion plate disposed between the surface light source device and the liquid crystal display panel to diffuse the light generated by the surface light source device; and
    an optical sheet disposed on the diffusion plate.

29. The liquid crystal display device of claim 23, further comprising:
    a receiving container that receives the surface light source device;
    a supporting member disposed between the surface light source device and the receiving container to support the surface light source device;
    a first mold disposed between the surface light source device and a diffusion plate to fasten the surface light source device to the receiving container and support the diffusion plate; and
    a second mold disposed between anthe optical sheet and the liquid crystal display panel to fix the diffusion plate and the optical sheet to the first mold and support the liquid crystal display panel.

30. The surface light source device of claim 23, wherein the hollow electrode has a U-shape.

31. The surface light source device of claim 23, wherein the hollow electrode has a rectangular tube shape.

32. The surface light source device of claim 23, wherein the hollow electrode has a box shape with one open face.

33. The surface light source device of claim 23, wherein the hollow electrode has a cylindrical tube shape.

34. The surface light source device of claim 23, wherein the hollow electrode has a rectangular shape with an open upper face.

35. The surface light source device of claim 23, further comprising;

a reflective layer disposed on an upper surface of the first substrate;

a first fluorescent layer disposed on the reflective layer; and a second fluorescent layer disposed on a lower surface of the second substrate.

* * * * *